US012807326B2

(12) United States Patent
Chakravorty et al.

(10) Patent No.: US 12,807,326 B2
(45) Date of Patent: Nov. 24, 2026

(54) SYSTEMS AND METHODS FOR POWER GENERATION AND AIRCRAFT COMPRISING THE SAME

(71) Applicant: HONEYWELL INTERNATIONAL INC., Charlotte, NC (US)

(72) Inventors: Saugata Chakravorty, Bangalore (IN); Ronak Tharakan, Bangalore (IN); Philip Robinson, Southborough, MA (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 677 days.

(21) Appl. No.: 18/167,143

(22) Filed: Feb. 10, 2023

(65) Prior Publication Data

US 2024/0217671 A1 Jul. 4, 2024

(30) Foreign Application Priority Data

Dec. 29, 2022 (IN) ............................. 202211076765

(51) Int. Cl.
*B64D 41/00* (2006.01)
*B01D 53/00* (2006.01)
*B64D 37/32* (2006.01)

(52) U.S. Cl.
CPC ............. *B64D 41/00* (2013.01); *B01D 53/00* (2013.01); *B64D 37/32* (2013.01); *B64D 2041/005* (2013.01)

(58) Field of Classification Search
CPC .. B64D 41/00; B64D 37/32; B64D 2041/005; B64D 27/355; B01D 53/00
See application file for complete search history.

(56) References Cited

U.S. PATENT DOCUMENTS 5,069,692 A * 12/1991 Grennan ................ B64D 13/00 96/136
5,088,276 A * 2/1992 Rifkin ........................ F02C 3/08 60/731

(Continued)

FOREIGN PATENT DOCUMENTS

| | | | |
|---|---|---|---|
| KR | 101051306 | B1 | 7/2011 |
| WO | 2016116898 | A1 | 7/2016 |
| WO | 2020043774 | A1 | 3/2020 |

*Primary Examiner* — Dung H Bui

(74) *Attorney, Agent, or Firm* — Ingrassia Fisher & Lorenz LLP

(57) ABSTRACT

Systems and methods are provided for power generation, for example, onboard an aircraft. The system comprises a first compressor configured to produce a pressurized air stream from a source of air, an air separation module configured to receive the pressurized air stream and produce therefrom a nitrogen-enriched air stream and an oxygen-enriched air stream, a second compressor configured to produce a pressurized oxygen-enriched air stream from the oxygen-enriched air stream, a hydrogen consuming power generation source configured to receive the pressurized oxygen-enriched air stream, and a turbine that is either coupled to the first or second compressor and configured to receive the nitrogen-enriched air stream from the air separation module, rotate in response to receiving the nitrogen-enriched air stream, and thereby cause rotation of the first or second compressor coupled thereto.

20 Claims, 4 Drawing Sheets

(56) References Cited

U.S. PATENT DOCUMENTS

| | | | | |
|---|---|---|---|---|
| 5,722,229 | A * | 3/1998 | Provost | F02C 3/113<br>60/785 |
| 6,471,195 | B2 * | 10/2002 | Shimanuki | H01M 8/04119<br>261/104 |
| 7,509,968 | B2 * | 3/2009 | Surawski | B64D 37/32<br>137/209 |
| 9,401,518 | B1 * | 7/2016 | Clark | H01M 8/04141 |
| 10,294,873 | B2 * | 5/2019 | Papa | F02C 7/047 |
| 10,382,123 | B2 * | 8/2019 | Richardson | H04B 10/29 |
| 11,628,393 | B2 * | 4/2023 | Rheaume | C01B 21/0438<br>95/54 |
| 2003/0005718 | A1 * | 1/2003 | Mitani | B64D 13/06<br>62/271 |
| 2004/0025507 | A1 * | 2/2004 | Leigh | B64D 37/32<br>123/563 |
| 2007/0023577 | A1 | 2/2007 | Jones | |
| 2008/0104958 | A1 * | 5/2008 | Finkenrath | B01D 53/00<br>60/602 |
| 2008/0160387 | A1 | 7/2008 | Delfino | |
| 2008/0213634 | A1 | 9/2008 | Grundel et al. | |
| 2013/0341465 | A1 * | 12/2013 | Massey | B64D 13/06<br>137/12 |
| 2014/0238501 | A1 * | 8/2014 | Tichborne | B64D 37/32<br>137/12 |
| 2015/0017557 | A1 | 1/2015 | Hoffjann et al. | |
| 2015/0188171 | A1 * | 7/2015 | Boodaghians | H01M 8/0662<br>429/410 |
| 2015/0364780 | A1 * | 12/2015 | Libis | H01M 8/249<br>429/429 |
| 2016/0118679 | A1 * | 4/2016 | Joos | H01M 8/04559<br>429/415 |
| 2016/0369700 | A1 | 12/2016 | Ribarov et al. | |
| 2017/0015557 | A1 * | 1/2017 | Daniello | B01D 65/08 |
| 2017/0191419 | A1 * | 7/2017 | Bayraktar | F01D 21/00 |
| 2018/0215475 | A1 * | 8/2018 | Hurt | B64D 13/08 |
| 2019/0184341 | A1 * | 6/2019 | Dey | B01D 53/228 |
| 2020/0171429 | A1 | 6/2020 | Giroud et al. | |
| 2020/0189761 | A1 * | 6/2020 | Emerson | B64D 37/32 |
| 2020/0261842 | A1 * | 8/2020 | Yuan | B64D 13/06 |
| 2020/0362764 | A1 * | 11/2020 | Saintignan | F02C 7/222 |
| 2021/0101693 | A1 * | 4/2021 | Rheaume | B01D 53/326 |
| 2023/0006222 | A1 * | 1/2023 | Quartarone | B64D 27/355 |
| 2024/0033553 | A1 * | 2/2024 | Cordatos | B01D 53/22 |
| 2024/0207778 | A1 * | 6/2024 | Surawski | B01D 53/22 |

* cited by examiner

SYSTEMS AND METHODS FOR POWER GENERATION AND AIRCRAFT COMPRISING THE SAME

CROSS REFERENCE TO RELATED APPLICATION

This application claims priority to India Provisional Patent Application No. 202211076765, filed Dec. 29, 2022, the entire content of which is incorporated by reference herein.

TECHNICAL FIELD

The present invention generally relates to power generation onboard aircraft, and more particularly relates to systems and methods for improving onboard power sources that include hydrogen consuming power generation systems.

BACKGROUND

Many aircraft include both a primary power source for propulsion (e.g., one or more main engines) and a secondary power source, for example, an auxiliary power unit (APU), for various other aircraft functions on ground and during in-flight emergencies, such as operation of certain flight deck systems, communication systems, and air-conditioning systems. In some examples, the APU may be used to start the primary power source. Typically, APUs provide electric and/or pneumatic power. Once the primary power source(s) are operative, the APU may be shutdown and any necessary secondary electric and pneumatic power may be extracted from the primary power source.

In recent years, there has been a shift toward more sustainable power generation systems as a source of primary propulsive power or secondary power. For example, systems based on fuel cell (FC) technologies have been pursued to reduce environmental impact and improve primary power source operability through fuel burn reduction. However, these technologies are still in early stages of adoption and improvements to efficiency and performance are desirable.

Hence, there is a need for systems and methods for implementing and improving FC technologies as primary power source for propulsion or as secondary power source in various aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for generating power. The system comprises a first compressor configured to produce a pressurized air stream from a source of air, an air separation module configured to receive the pressurized air stream from the first compressor and produce therefrom a nitrogen-enriched air stream and an oxygen-enriched air stream, a second compressor configured to produce a pressurized oxygen-enriched air stream from the oxygen-enriched air stream, a hydrogen consuming power generation source configured to receive the pressurized oxygen-enriched air stream from the second compressor, and a turbine configured to receive the nitrogen-enriched air stream from the air separation module and rotate in response to receiving the nitrogen-enriched air stream, wherein the turbine is coupled to either the first compressor and rotation of the turbine causes rotation of the first compressor, or the second compressor and rotation of the turbine causes rotation of the second compressor.

A method is provided for generating power. The method comprises producing a pressurized air stream from a source of air by driving a first compressor, receiving the pressurized air stream from the first compressor with an air separation module and producing therefrom a nitrogen-enriched air stream and an oxygen-enriched air stream, producing a pressurized oxygen-enriched air stream from the oxygen-enriched air stream by driving a second compressor, receiving the pressurized oxygen-enriched air stream from the second compressor with a hydrogen consuming power generation source, and receiving the nitrogen-enriched air stream from the air separation module with a turbine and rotating the turbine in response to receiving the nitrogen-enriched air stream, wherein the turbine is either coupled to the first compressor and rotation of the turbine causes rotation of the first compressor, or coupled to the second compressor and rotation of the turbine causes rotation of the second compressor.

An aircraft is provided. The aircraft includes a first compressor configured to produce a pressurized air stream from a source of air, an air separation module configured to receive the pressurized air stream from the first compressor and produce therefrom a nitrogen-enriched air stream and an oxygen-enriched air stream, a second compressor configured to produce a pressurized oxygen-enriched air stream from the oxygen-enriched air stream, a hydrogen consuming power generation source configured to receive the pressurized oxygen-enriched air stream from the second compressor, a turbine configured to receive the nitrogen-enriched air stream from the air separation module and rotate in response to receiving the nitrogen-enriched air stream, wherein the turbine is coupled to either the first compressor and rotation of the turbine causes rotation of the first compressor, or the second compressor and rotation of the turbine causes rotation of the second compressor, a first onboard system configured to selectively receive and use a turbine exhaust stream exiting the turbine, wherein the first onboard system is a fuel tank inerting system, an energy supply device (ESD) bay inerting system, a fuel cell purging system, a fire suppression system, a water system, or a hydraulic reservoir pressurization system, and a second onboard system configured to selectively receive and use the nitrogen-enriched air stream from the air separation module, wherein the second onboard system is a heating system or a wing anti-icing system of the aircraft.

Furthermore, other desirable features and characteristics of the system, method, and aircraft will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
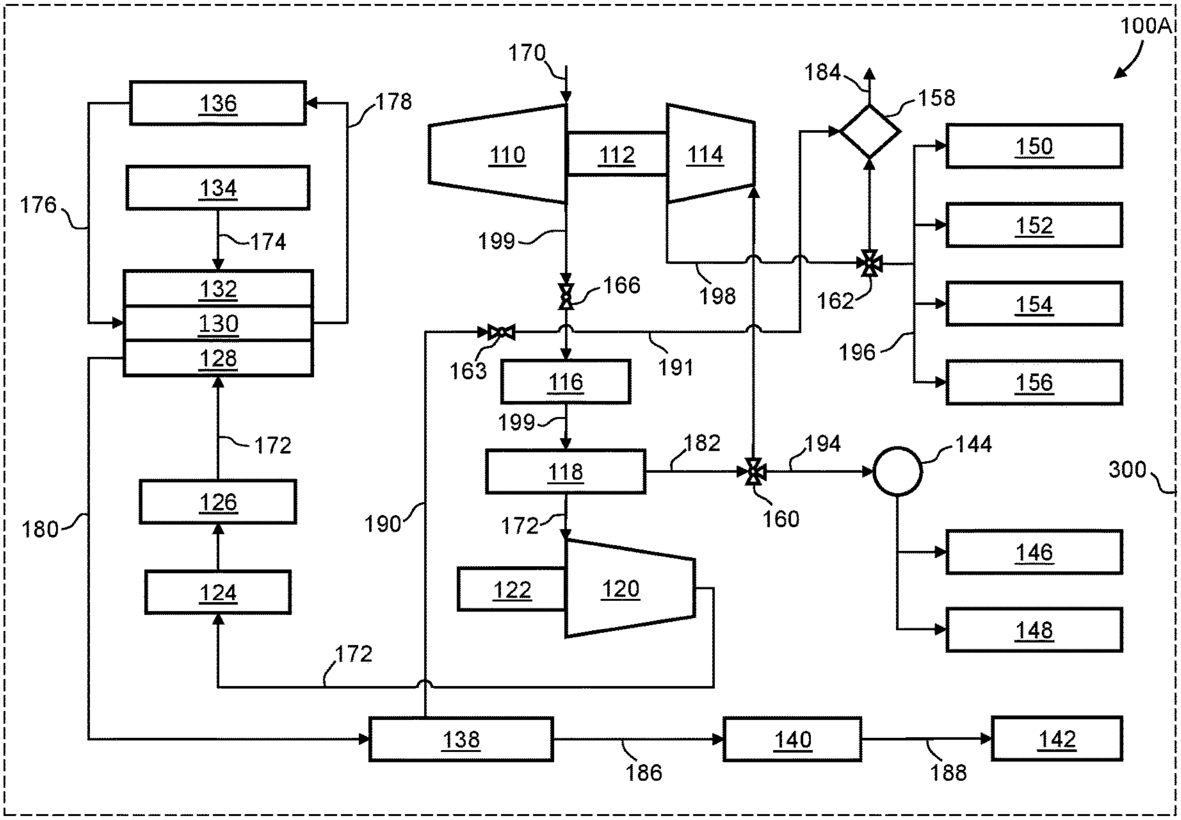
FIG. 1 is a block diagram schematically representing a power generating system onboard an aircraft according to various embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Systems and methods disclosed herein provide for implementing and improving onboard power generating systems in an aircraft. The systems include a hydrogen consuming power generation source, for example, a polymer electrolyte membrane fuel cell (PEMFC) system or various hydrogen burning turbomachinery, for use as a power generation system within the aircraft. The system generally includes a hydrogen supply system configured to provide hydrogen to the hydrogen consuming power generation source, an air supply system configured to supply air to the hydrogen consuming power generation source for use as an oxidant, a cooling system configured to supply a coolant to the hydrogen consuming power generation source, and an exhaust system configured to remove exhaust produced by the hydrogen consuming power generation source during generation of electrical power.

In various embodiments, the air supply system includes a turbo-compressor that includes a compressor for producing a compressed/pressurized air stream from a source of air (e.g., ambient air and/or cabin air), an electric motor for driving the compressor, and a turbine for generating mechanical power for driving the compressor and thereby augmenting the electric motor. The air supply system further includes an air separation module (ASM) configured to receive the pressurized air stream from the compressor and produce therefrom a high-pressure nitrogen-enriched air (NEA) stream and a low-pressure oxygen-enriched air (OEA) stream. In various embodiments, the ASM may include semi-permeable, hollow fiber membranes. The OEA stream is directed to the hydrogen consuming power generation source for use thereby and the NEA stream is directed to the turbine of the turbo-compressor which causes rotation of the turbine and thereby produces mechanical power and thereby augments the electric motor. In various embodiments, the low-pressure OEA stream may be directed to another compressor or other device configured to increase the pressure of the OEA stream prior to being provided to the hydrogen consuming power generation source.

In various embodiments, a NEA exhaust stream exiting the turbine of the turbo-compressor may be provided for use by various other systems onboard the aircraft. In various embodiments, the NEA exhaust stream may be used to inert (i.e., reduce an oxygen content), purge (i.e., reduce a content of one or more elements), and/or pressurize an enclosed environment. Exemplary applications may include, but are not limited to, providing the NEA exhaust stream for use by a fuel tank inerting system, an energy supply device (ESD) bay inerting system, a fuel cell purging system, a fire suppression system, and water or hydraulic reservoir pressurization systems.

In various embodiments, the NEA stream may be provided directly to various other systems onboard the aircraft rather than or in addition to the turbine of the turbo-compressor. In various embodiments, the NEA stream may be used to increase a temperature of a surface or a volume. Exemplary applications may include, but are not limited to a heating system or a wing anti-icing system. In such examples, the system may include a heating element for heating the NEA stream.

The systems and methods disclosed herein may be used to, for example, provide onboard electrical power to various aircraft including, but not limited to, manned business, commercial, and/or military aircraft and unmanned aerial vehicles (UAVs). In various embodiments, the systems and methods may be used as a primary power source for a fully electric aircraft including providing power for both propulsion and for operating other systems of the aircraft. In various embodiments, the systems and methods may be used as a secondary power source (e.g., as an auxiliary power unit (APU)) for a more electric aircraft (MEA) including providing additional electrical power and/or backup electrical power to a primary power source (e.g., no-bleed air, jet fuel consuming main engine) during operation of the primary power source, and providing electrical power for operating other systems of the aircraft during non-operation of the primary power source. The electrical power generated by the systems and methods may be used, for example, to provide propulsion for the aircraft and/or for powering various other aircraft functions including, but not limited to, flight deck systems, communication systems, flight control systems, interior lighting systems, environmental control systems (ECSs), etc.

Figure 2:
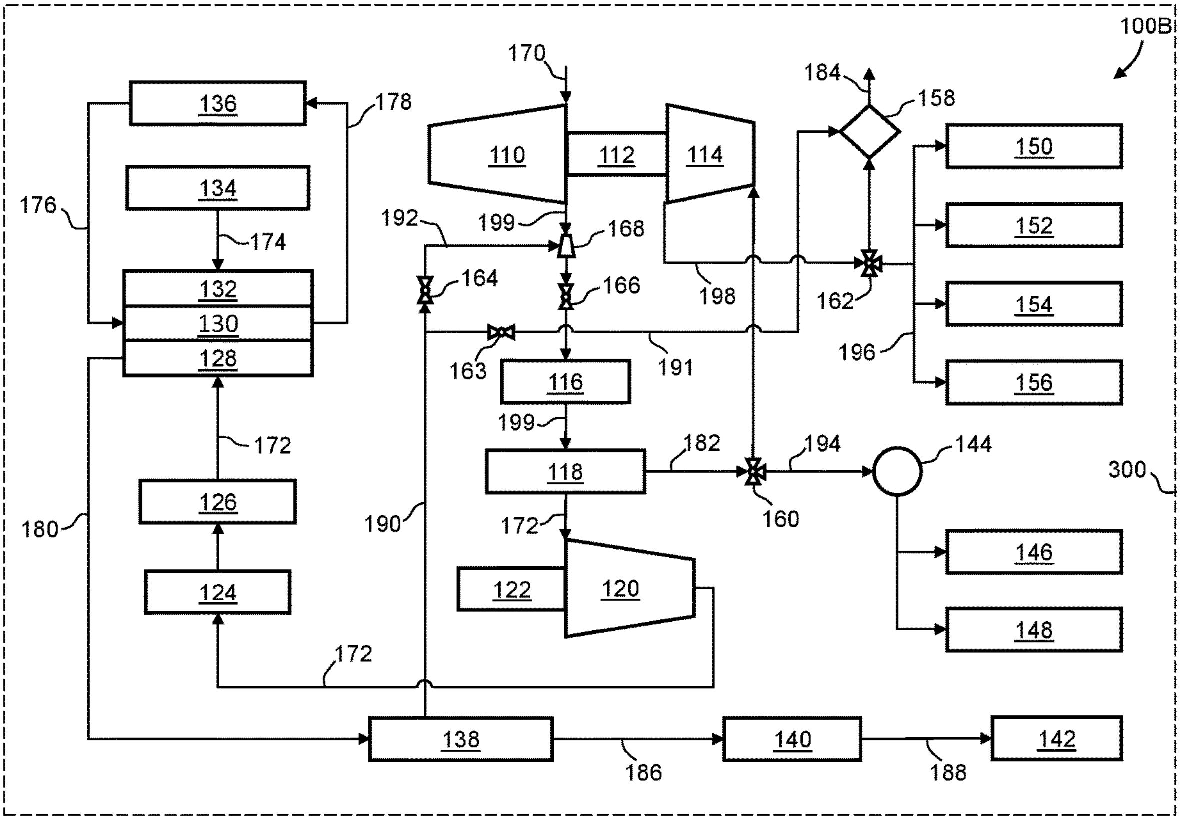
FIG. 2 is a block diagram schematically representing a modified version of the power generating system of FIG. 1 according to various embodiments.
Figure 3:
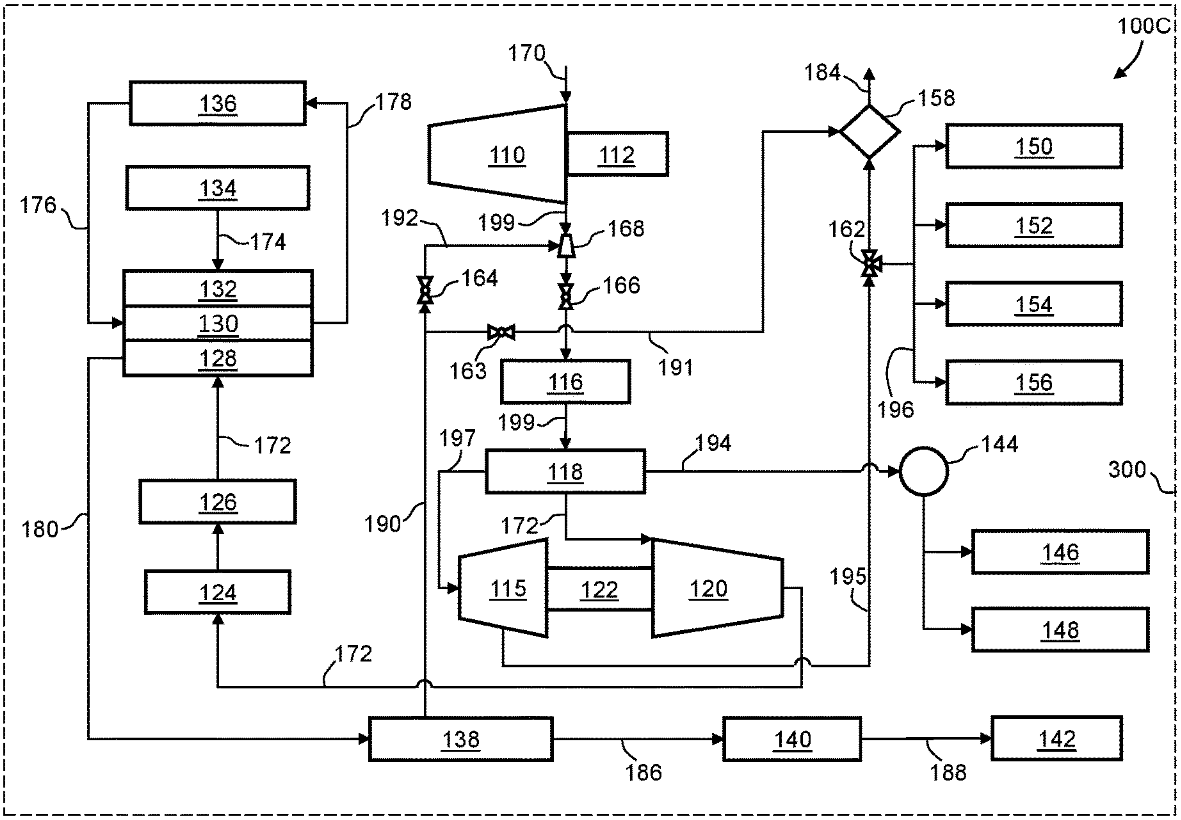
FIG. 3 is a block diagram schematically representing another modified version of the power generating system of FIG. 1 according to various embodiments.

FIGS. 1-3 present an exemplary system 100 (referred to as 100A, 100B, and 100C in FIGS. 1-3, respectively) for generating electrical power onboard an aircraft 300. Referring initially to FIGS. 1 and 2, the system 100 has a turbo-compressor including a first compressor 110 for pressurizing air from an air source, a shaft coupled to the first compressor 110, a first electric motor 112 for rotating the shaft and thereby driving the first compressor 110, and a turbine 114 for providing mechanical power to rotate the shaft and thereby augment the electric motor 112. During operation, air may be received from the air source, via air supply line 170, and pressurized by the first compressor 110. Exemplary but nonlimiting pressures for the pressurized air exiting the first compressor 110 include between about 15 to 120 psi (about 100 to 800 kPa), such as about 18 to 65 psi (about 125 to 450 kPa). In various embodiments, an exemplary nominal pressure for the pressurized air exiting the first compressor 110 is about 61.5 psi (about 425 kPa).

The pressurized air stream may then be directed to an air separation module 118, via a pressurized air supply line 199, which separates the air into an OEA stream and a NEA stream. In various embodiments, the NEA stream may have a composition comprising greater than 78 percent nitrogen, such as greater than 87 percent nitrogen, or equal to or greater than 99 percent nitrogen, and less than 21 percent oxygen, such as less than 12 percent oxygen, or equal to or less than 1 percent oxygen. In various embodiments, the OEA stream may have a composition comprising greater than 21 percent oxygen, such as greater than 30 percent oxygen, or greater than 98 percent oxygen, and less than 78 percent nitrogen, such as less than 12 percent nitrogen, or less than 2 percent nitrogen.

Prior to providing the pressurized air stream to the air separation module 118, the pressurized air stream may be preconditioned to promote efficiency of the air separation module 118. For example, the system 100 includes a first heat exchanger 116 (e.g., an intercooler) configured to lower a temperature of the pressurized air stream to an operating temperature of the air separation module 118 and a pressure regulator 166 configured to adjust a pressure of the pressurized air stream to an operating pressure of the air separation module 118. Exemplary but nonlimiting temperatures for the pressurized air exiting the first heat exchanger 116 include less than about 90 to 190° F. (about 32 to 88° C.). In various embodiments, an exemplary nominal temperature for the pressurized air exiting the first compressor 110 is about 400° F. (about 205)° ° C. and exemplary temperatures include about 95 to 600° F. (35 to 315° C.). Exemplary but nonlimiting pressures for the pressurized air exiting the pressure regulator 166 include about 25 to 105 psi (about 172 to 725 kPa). In various embodiments, an exemplary nominal pressure for the pressurized air exiting the pressure regulator 166 is about 60.5 psi (about 417 kPa).

The OEA stream may be directed via, a OEA line 172, to one or more stacks of PEMFCs of a PEMFC system. Although the PEMFC system may include any number of PEMFCs, for convenience the system 100 will be described hereinafter in reference to a single PEMFC 130 having a cathode side 128 and an anode side 132. Prior to providing the OEA stream to the PEMFC 130, the OEA stream may be pre-conditioned to promote efficiency of the PEMFC 130. For example, the system 100 includes, coupled inline with the OEA line 172, a second compressor 120 driven by a second electric motor 122 configured to increase a pressure of the OEA stream to an operating pressure of the PEMFC 130, a second heat exchanger 124 (e.g., precooler) configured to lower a temperature of the OEA stream to an operating temperature of the PEMFC 130, and a humidifier 126 configured to increase a relative humidity of the OEA stream to an operating relative humidity of the PEMFC 130.

The system 100 includes a hydrogen supply system 134 configured to provide hydrogen to the PEMFC 130, via a hydrogen supply line 174, and a cooling system 136 configured to supply a coolant to the PEMFC 130, via a coolant supply line 176, and receive the coolant from the PEMFC 130, via a coolant return line 178. Although not shown, the cooling system 136 may provide the coolant to one or both of the first and second heat exchangers 116 and 124. A PEMFC exhaust line 180 is provided to direct an exhaust stream exiting the PEMFC 130 (e.g., the cathode side 128), referred to hereinafter as the PEMFC exhaust stream, during generation of electrical power to an exhaust outlet line 184.

In various embodiments, the system 100 may include a water separation module 138 configured to receive the PEMFC exhaust stream, via the PEMFC exhaust line 180, and extract water therefrom. Water extracted from the PEMFC exhaust stream may be transported, via a water supply line 186, to and stored in a water tank 140 and selectively provided to one or more water systems 142 (e.g., lavatories) onboard the aircraft 300, via one or more water system lines 188.

After being processed by the water separation module 138, a reduced-moisture exhaust stream may be directed, via a primary reduced-moisture exhaust line 190, a valve 163, and a secondary reduced-moisture exhaust line 191, to the exhaust outlet line 184.

In various embodiments, the system 100 may be configured to recirculate at least some of the PEMFC exhaust stream. For example, FIG. 2 presents the system 100 (i.e., 100B) as further including a flow regulator 164, a recirculation line 192, and a mixer 168 (e.g., ejector type) coupling the primary reduced-moisture exhaust line 190 to the pressurized air supply line 199 (e.g., between the first compressor 110 and the pressure regulator 166). The flow regulator 164 is configured to selectively control the flow of the reduced-moisture exhaust stream into the mixer 168. The mixer 168 is configured to receive the reduced-moisture exhaust stream, receive the pressurized air stream from the first compressor 110, and mix the pressurized air stream with the reduced-moisture exhaust stream prior to being received by the air separation module 118. The percentage of the PEMFC exhaust stream recirculated may depend on the stoichiometry of the cathode side 128 of the PEMFC 130. In various embodiments, the reduced-moisture exhaust stream recirculated into the pressurized air stream of the pressurized air supply line 199 may account for between about 10 to 90 percent of the air provided to the first heat exchanger 116, such as about 15 to 45 percent, with the remaining percentage being provided from the first compressor 110. During operation of the system 100, the valve 163 may be operated to selectively bleed some of the reduced-moisture exhaust stream to reduce build-up of dilutant gases, such as $CO_2$ and/or $N_2$, within the PEMFC 130. The valve 163 may further be operated to perform a purging process on the PEMFC 130.

The NEA stream may be directed, via an NEA line 182, to the turbine 114 to cause rotation thereof and thereby generate mechanical power that may be used to rotate the compressor and thereby augment the first electric motor 112. An exhaust stream exiting from the turbine 114, referred to hereinafter as the turbine exhaust stream, may be directed to the exhaust outlet line 184.

In various embodiments, the turbine exhaust stream exiting the turbine 114 may be selectively directed to various onboard systems of the aircraft 300 for use by such systems. For example, the system 100 includes a flow diverter 162 configured to selectively direct flow of the turbine exhaust stream, via turbine exhaust supply lines 196, to one or more of a fuel tank inerting system 150, a fuel cell purging system 152, a fire suppression system 154, and a hydrogen supply line containment volume inerting system 156.

In various embodiments, the NEA stream may be provided directly to various other systems onboard the aircraft 300 rather than or in addition to being provided to the turbine 114. For example, the system 100 includes a flow diverter 160 configured to selectively direct flow of the NEA stream to one or both of a heating system 146 and a wing anti-icing system 148, via NEA supply lines 194. In various embodiments, the system 100 includes a heating element 144 coupled to and inline with the NEA supply lines 194 between the flow diverter 160 and the heating system 146 and the wing anti-icing system 148 that is configured to increase a temperature of the nitrogen-enriched air of the NEA stream.

The system 100 includes a mixer 158 configured to receive the reduced-moisture exhaust stream, via the reduced-moisture exhaust line 190, receive the turbine exhaust stream, via the turbine exhaust line 198, and mix the reduced-moisture exhaust stream with the turbine exhaust stream prior to directing the mixture thereof to the exhaust outlet line 184.

Referring now to FIG. 3, another version of the system 100 (i.e., 100C) is presented wherein the NEA line 182, the turbine 114, and the turbine exhaust line 198 are omitted. In this version, instead of using the NEA stream to rotate the turbine 114 and thereby rotate the first compressor 110, the system 100 includes a secondary turbine 115 coupled to the second compressor 120 via a shaft. In this version, the NEA stream may be directed, via a secondary NEA line 197, to the secondary turbine 115 to cause rotation thereof and thereby generate mechanical power that may be used to rotate the compressor 120 and thereby augment the second electric motor 122. An exhaust stream exiting from the secondary turbine 115, referred to hereinafter as the secondary turbine exhaust stream, may be directed to the exhaust outlet line 184 via a secondary turbine exhaust line 195. Although FIG. 3 presents the system 100 (i.e., 100C) as recirculating at least some of the PEMFC exhaust stream (as described for the system 100B in FIG. 2), the version of the system 100 presented in FIG. 3 (i.e., 100C) may alternatively omit the flow regulator 164, the recirculation line 192, and the mixer 168 and instead direct an entirety of the reduced-moisture exhaust stream to the exhaust outlet line 184 (as described for the system 100A in FIG. 1). In various embodiments, the second electric motor 122 may be unnecessary and can be omitted. For example, if the system 100 is operating without recirculation of the PEMFC exhaust stream and at a pressure of about 250 kPa or less, the rotation of the secondary turbine 115 may be sufficient to operate the second compressor 120 and therefore the second electric motor 122 may be omitted to reduce the weight of the aircraft 300.

Although not shown, the system 100 may include various additional components, such as control systems (mechanical, electrical or electronic or any combination thereof) and instrumentation, for operation and regulation thereof. For example, the system 100 may include one or more controllers associated with each of the components of the system 100 for controlling operation thereof. Such controllers may be configured for automatic control of the corresponding components as directed by preprogrammed instructions stored in nonvolatile memory devices thereof, based on, for example, sensed conditions of the system 100 (e.g., temperatures, pressures, compositions, etc.) or signals provided by other components of the aircraft 300. Alternatively, or in addition, the controllers may be configured for manual control based on user input via human machine interfaces. As another example, the system 100 may include various flow control valves and pressure regulators not shown in the figures, such as upstream and/or downstream of the PEMFC 130, the humidifier 126, the first compressor 110, the second compressor 120, etc.

Figure 4:
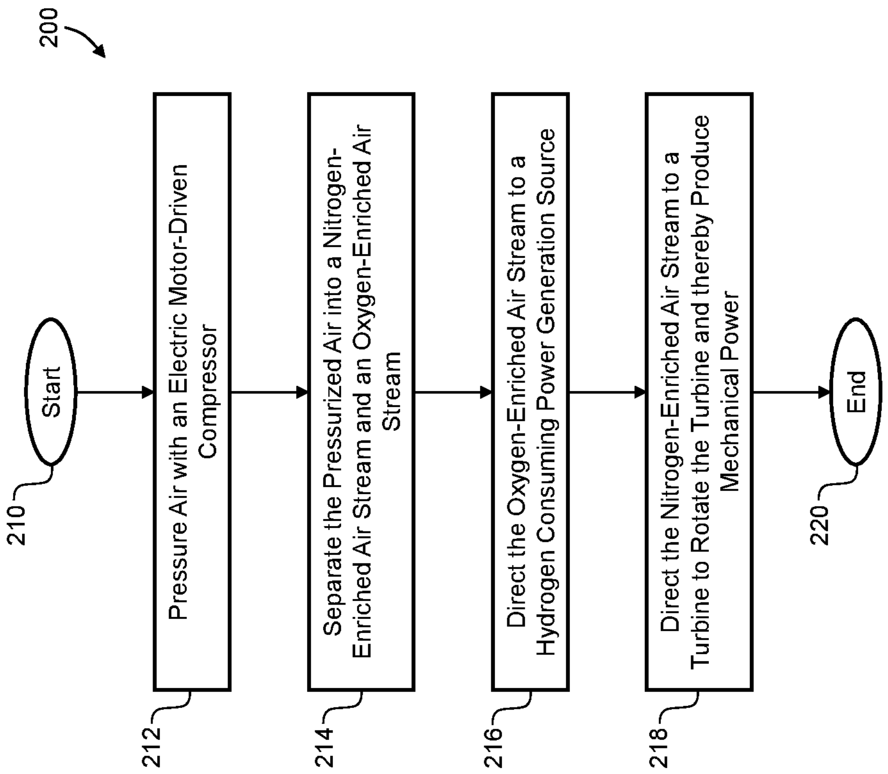
FIG. 4 is a flow chart representing a method of a power generating system onboard an aircraft according to various embodiments.

The systems disclosed herein, including the system 100, provide for methods of implementing and improving onboard power sources on an aircraft. For example, FIG. 4 is a flow chart illustrating an exemplary method 200. The method 200 may begin at 210. At 212, the method 200 may include producing a pressurized air stream from a source of air by driving a turbo-compressor (e.g., the first compressor 110) with an electric motor (e.g., the first electric motor 112). The pressurized air stream may be separated with an air separation module (e.g., the air separation module 118) at 214 into a NEA stream and an OEA stream. The OEA stream may be directed at 216 from the air separation module to a hydrogen consuming power generation source (e.g., the PEMFC 130). The NEA stream may be directed at 218 from the air separation module to a turbine (e.g., the turbine 114) to rotate the turbine and thereby produce mechanical power. The method 200 may end at 220.

In various embodiments, the method 200 may include selectively directing an exhaust stream from the turbine for use by an onboard system of the aircraft. In various embodiments, the method 200 may include selectively directing the NEA stream from the air separation module to an onboard system of the aircraft.

In various embodiments, the method 200 may include directing an exhaust stream from the hydrogen consuming power generation source to a mixer (e.g., the mixer 168), directing the pressurized air stream from the compressor to the mixer, and mixing the pressurized air stream with the exhaust stream prior to directing the pressurized air stream to the air separation module.

The systems and methods disclosed herein provide various benefits over certain existing systems and methods. For example, the PEMFC 130 may operate with improved efficiency using the oxygen-enriched air rather than, for example, ambient air. In addition, rotation of the turbine 114 using the nitrogen-enriched air to generate mechanical power to augment the electric motor reduces the overall electrical power burden on the system 100. Supplying the NEA stream directly or indirectly (e.g., as the exhaust stream from the turbine 114) to other onboard systems expands the functionality of the system 100 and reduces the need for certain additional systems onboard the aircraft 300 (e.g., various electric or pneumatic systems). Recirculating the exhaust stream from the PEMFC 130 into the pressurized air stream at the mixer 168 reduces the power burden on the system 100 and provides for the PEMFC 130 to be operated over a broader range of cathode stoichiometries.

It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:

a first onboard system of an aircraft, the first onboard system including:

a first compressor configured to produce a pressurized air stream from a source of air;

an air separation module configured to receive the pressurized air stream from the first compressor and produce therefrom a nitrogen-enriched air stream and an oxygen-enriched air stream;

a second compressor configured to produce a pressurized oxygen-enriched air stream from the oxygen-enriched air stream;

a hydrogen consuming power generation source configured to receive the pressurized oxygen-enriched air stream from the second compressor; and a turbine configured to receive the nitrogen-enriched air stream from the air separation module and rotate in response to receiving the nitrogen-enriched air stream, wherein the turbine is coupled to the first compressor and rotation of the turbine causes rotation of the first compressor;

a second onboard system of the aircraft, the second onboard system including a fuel tank inerting system, an energy supply device (ESD) bay inerting system, a fuel cell purging system, a fire suppression system, a water system, or a hydraulic reservoir pressurization system, wherein the first onboard system is configured to direct an exhaust stream exiting the turbine thereof to the second onboard system; and a third onboard system of the aircraft, the third onboard system including a heating element, a heating system and a wing anti-icing system of the aircraft, wherein the first onboard system is configured to direct the nitrogen-enriched air stream from the air separation module thereof to the third onboard system, wherein the heating element is configured to increase a temperature of the nitrogen-enriched air stream prior to supplying the nitrogen-enriched air stream to the heating system and the wing anti-icing system.

2. The system of claim 1, wherein the hydrogen consuming power generation source includes hydrogen burning turbomachinery or a fuel cell.

3. The system of claim 1, further comprising an ejector-type mixer configured to receive an exhaust stream exiting the hydrogen consuming power generation source, receive the pressurized air stream from the first compressor, and mix the pressurized air stream with the exhaust stream prior to the pressurized air stream being received by the air separation module.

4. The system of claim 3, further comprising a flow regulator configured to selectively control a flow rate of the exhaust stream into the mixer, wherein a percentage of the exhaust stream recirculated into the pressurized air stream accounts for between about 10 to 90 percent of air provided to the air separation module, wherein the mixer is positioned between the first compressor and the air separation module, and wherein the flow of the exhaust stream into the mixer is configured such that the exhaust stream accounts for between about 15 to 45 percent of air provided to the air separation module.

5. The system of claim 1, further comprising a water separation module configured to receive an exhaust stream exiting the hydrogen consuming power generation source, and extract water from the exhaust stream.

6. The system of claim 1, wherein the air separation module comprises semi-permeable, hollow fiber membranes.

7. The system of claim 1, further comprising a first heat exchanger configured to lower a temperature of the pressurized air stream to an operating temperature of the air separation module prior to the pressurized air stream being received by the air separation module.

8. The system of claim 7, further comprising:

a second heat exchanger configured to lower a temperature of the oxygen-enriched air stream to an operating temperature of the hydrogen consuming power generation source; and a humidifier configured to increase a relative humidity of the oxygen-enriched air stream to an operating relative humidity of the hydrogen consuming power generation source, wherein the second heat exchanger and the humidifier are positioned fluidically between the second compressor and the hydrogen consuming power generation source.

9. The system of claim 1, further comprising a pressure regulator configured to adjust a pressure of the pressurized air stream to an operating pressure of the air separation module prior to the pressurized air stream being received by the air separation module, wherein the pressurized air stream exiting the first compressor has a pressure between about 100 to 800 kPa.

10. The system of claim 1, wherein the nitrogen-enriched air stream comprises greater than 87 percent nitrogen and less than 12 percent oxygen, wherein the oxygen-enriched air stream comprises greater than 30 percent oxygen.

11. An aircraft comprising:

a first compressor configured to produce a pressurized air stream from a source of air;

an air separation module configured to receive the pressurized air stream from the first compressor and produce therefrom a nitrogen-enriched air stream and an oxygen-enriched air stream using semi-permeable, hollow fiber membranes;

a second compressor configured to produce a pressurized oxygen-enriched air stream from the oxygen-enriched air stream;

a hydrogen consuming power generation source configured to receive the pressurized oxygen-enriched air stream from the second compressor;

a turbine configured to receive the nitrogen-enriched air stream from the air separation module, and rotate in response to receiving the nitrogen-enriched air stream, wherein the turbine is coupled to either:

the first compressor and rotation of the turbine causes rotation of the first compressor, or the second compressor and rotation of the turbine causes rotation of the second compressor;

first onboard systems each configured to selectively receive and use a turbine exhaust stream exiting the turbine, wherein the first onboard systems include a fuel tank inerting system, an energy supply device (ESD) bay inerting system, a fuel cell purging system, a fire suppression system, a water system, and a hydraulic reservoir pressurization system; and second onboard systems each configured to selectively receive and use the nitrogen-enriched air stream from the air separation module, wherein the second onboard systems include a heating system and a wing anti-icing system of the aircraft.

12. The aircraft of claim 11, further comprising an ejector-type mixer configured to receive an exhaust stream from the hydrogen consuming power generation source, receive the pressurized air stream from the first compressor, and mix the pressurized air stream with the exhaust stream prior to the pressurized air stream being received by the air separation module, the aircraft including a flow regulator configured to selectively control a flow rate of the exhaust stream into the mixer, wherein a percentage of the exhaust stream recirculated into the pressurized air stream accounts for between about 10 to 90 percent of air provided to the air separation module, wherein the mixer is positioned between the first compressor and the air separation module, and wherein the flow of the exhaust stream into the mixer is configured such that the exhaust stream accounts for between about 15 to 45 percent of air provided to the air separation module.

13. The aircraft of claim 11, further comprising a first heat exchanger configured to lower a temperature of the pressurized air stream to an operating temperature of the air separation module prior to the pressurized air stream being received by the air separation module;

a second heat exchanger configured to lower a temperature of the oxygen-enriched air stream to an operating temperature of the hydrogen consuming power generation source; and a humidifier configured to increase a relative humidity of the oxygen-enriched air stream to an operating relative humidity of the hydrogen consuming power generation source, wherein the second heat exchanger and the humidifier are positioned fluidically between the second compressor and the hydrogen consuming power generation source.

14. The aircraft of claim 11, wherein the second onboard systems include a heating element configured to receive the nitrogen-enriched air stream from the air separation module and increase a temperature of the nitrogen-enriched air stream prior to supplying the nitrogen-enriched air stream to the heating system and the wing anti-icing system.

15. The aircraft of claim 11, further comprising a water separation module configured to receive an exhaust stream exiting the hydrogen consuming power generation source, and extract water from the exhaust stream.

16. A system comprising:

a first onboard system of an aircraft, the first onboard system including:

a first compressor configured to produce a pressurized air stream from a source of air;

an air separation module configured to receive the pressurized air stream from the first compressor and produce therefrom a nitrogen-enriched air stream and an oxygen-enriched air stream;

a second compressor configured to produce a pressurized oxygen-enriched air stream from the oxygen-enriched air stream;

a hydrogen consuming power generation source configured to receive the pressurized oxygen-enriched air stream from the second compressor; and a turbine configured to receive the nitrogen-enriched air stream from the air separation module and rotate in response to receiving the nitrogen-enriched air stream, wherein the turbine is coupled to the second compressor and rotation of the turbine causes rotation of the second compressor;

a second onboard system of the aircraft, the second onboard system including a fuel tank inerting system, an energy supply device (ESD) bay inerting system, a fuel cell purging system, a fire suppression system, a water system, or a hydraulic reservoir pressurization system, wherein the first onboard system is configured to direct an exhaust stream exiting the turbine thereof to the second onboard system; and a third onboard system of the aircraft, the third onboard system including a heating element, and a heating system or a wing anti-icing system of the aircraft, wherein the first onboard system is configured to direct the nitrogen-enriched air stream from the air separation module thereof to the third onboard system, wherein the heating element configured to receive the nitrogen-enriched air stream from the first onboard system and increase a temperature of the nitrogen-enriched air stream prior to supplying the nitrogen-enriched air stream to the heating system and the wing anti-icing system.

17. The system of claim 16, wherein the hydrogen consuming power generation source includes hydrogen burning turbomachinery or a fuel cell, wherein the air separation module comprises semi-permeable, hollow fiber membranes, the system including a pressure regulator configured to adjust a pressure of the pressurized air stream to an operating pressure of the air separation module prior to the pressurized air stream being received by the air separation module, wherein the pressurized air stream exiting the first compressor has a pressure between about 100 to 800 kPa, wherein the nitrogen-enriched air stream comprises greater than 87 percent nitrogen and less than 12 percent oxygen, wherein the oxygen-enriched air stream comprises greater than 30 percent oxygen.

18. The system of claim 16, further comprising an ejector-type mixer configured to receive an exhaust stream from the hydrogen consuming power generation source, receive the pressurized air stream from the first compressor, and mix the pressurized air stream with the exhaust stream prior to the pressurized air stream being received by the air separation module, the aircraft including a flow regulator configured to selectively control a flow rate of the exhaust stream into the mixer, wherein a percentage of the exhaust stream recirculated into the pressurized air stream accounts for between about 10 to 90 percent of air provided to the air separation module, wherein the mixer is positioned between the first compressor and the air separation module, and wherein the flow of the exhaust stream into the mixer is configured such that the exhaust stream accounts for between about 15 to 45 percent of air provided to the air separation module.

19. The system of claim 16, further comprising:

a first heat exchanger configured to lower a temperature of the pressurized air stream to an operating temperature of the air separation module prior to the pressurized air stream being received by the air separation module;

a second heat exchanger configured to lower a temperature of the oxygen-enriched air stream to an operating temperature of the hydrogen consuming power generation source; and a humidifier configured to increase a relative humidity of the oxygen-enriched air stream to an operating relative humidity of the hydrogen consuming power generation source, wherein the second heat exchanger and the humidifier are positioned fluidically between the second compressor and the hydrogen consuming power generation source.

20. The system of claim 16, further comprising a water separation module configured to receive an exhaust stream exiting the hydrogen consuming power generation source, and extract water from the exhaust stream.

* * * * *